US 6,556,765 B2

(12) United States Patent
Heffner et al.

(10) Patent No.: US 6,556,765 B2
(45) Date of Patent: Apr. 29, 2003

(54) PLANAR VARIABLE OPTICAL ATTENUATOR

(75) Inventors: Brian Lee Heffner, San Jose, CA (US); Gokul Krishnan, San Jose, CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/835,339

(22) Filed: Apr. 17, 2001

(65) Prior Publication Data

US 2002/0150378 A1 Oct. 17, 2002

(51) Int. Cl.[7] .................................................. G02B 6/26
(52) U.S. Cl. ....................................................... 385/140
(58) Field of Search ............................. 385/18, 15, 19, 385/25, 37, 140; 359/223

(56) References Cited

U.S. PATENT DOCUMENTS

| | | | | |
|---|---|---|---|---|
| 4,707,059 A | * | 11/1987 | Ogura et al. ................... 385/7 |
| 5,654,819 A | * | 8/1997 | Goossen et al. ............. 359/291 |
| 5,909,078 A | * | 6/1999 | Wood et al. .................. 310/307 |
| 5,915,063 A | * | 6/1999 | Colbourne et al. .......... 385/140 |
| 5,943,454 A | * | 8/1999 | Aksyuk et al. ................ 385/22 |
| 6,137,941 A |   | 10/2000 | Robinson ...................... 385/140 |
| 6,163,643 A | * | 12/2000 | Bergmann et al. ........... 385/140 |
| 6,246,826 B1 | * | 6/2001 | O'Keefe et al. ............. 385/140 |
| 6,275,320 B1 | * | 8/2001 | Dhuler et al. ................ 359/237 |

* cited by examiner

*Primary Examiner*—Robert H. Kim
*Assistant Examiner*—Therese Barber
(74) *Attorney, Agent, or Firm*—Hall, Priddy, Myers & Vande Sande

(57) ABSTRACT

A planar optical attenuator designed as a MEMS structure has a mirror opposite an input and an output waveguide, and a TAB actuator for lateral displacement of the mirror relative to the input port and/or output port. The effective reflectivity of the mirror is variable as a function of the lateral location on the mirror. The optical attenuation is varied by varying the location on the mirror at which the optical beam is reflected.

10 Claims, 1 Drawing Sheet

PLANAR VARIABLE OPTICAL ATTENUATOR

FIELD OF THE INVENTION

This invention relates to variable optical attenuators employed in fiber-optic transmission systems, more particularly to small-size variable optical attenuators suitable for miniaturized fiber optic assemblies.

BACKGROUND ART

Optical attenuators are staple components in fiber optic transmission systems, and numerous designs of variable optical attenuators are known in the art. E. g. Colbourne et al. in U.S. Pat. No. 5,915,063 describe a variable optical attenuator with a flat mirror positioned opposite a pair of waveguides and with an actuator causing a controlled tilting of the mirror.

Robinson, in U.S. Pat. No. 6,137,941, discloses a microelectromechanical (MEMS) structure with a pivotable reflector facing a pair of waveguides and a lens between the waveguides and the reflector.

Thermal arched beam (TAB) actuators have recently been developed and are described e.g. in U.S. Pat. Nos. 5,909,078 (Wood et al.) and 5,994,816 (Dhuler et al.) as well as in a copending U.S. patent application Ser. No. 09/537,588 filed Mar. 28, 2000. The three specifications are hereby incorporated herein by reference.

In keeping with the ubiquitous trend towards miniaturization of fiber-optic assemblies and components, there is still a need for a compact, simple and fast-acting device for attenuating optical signals.

SUMMARY OF THE INVENTION

It has been recognized that in most attenuators and similar components using flat, uniform mirrors or reflectors, the coupling efficiency of the optical beam reflected from the mirror is a function of the degree of overlap of the reflected beam with the output port or waveguide, while the intensity of the reflected beam remains substantially unchanged over a range of positions of the mirror.

The present invention proposes a different approach, wherein the coupling efficiency of the attenuator is a function of reflectivity of the mirror/reflector.

In accordance with the invention, there is provided an optical attenuator comprising a substantially planar substrate, an input port for providing an input optical beam, a variable reflectivity mirror disposed substantially in the plane of the substrate and oriented to receive the input optical beam and provide a reflected optical beam, and an actuator for changing the position of the mirror to vary the strength of the reflected optical signal. The reflectivity of the mirror may vary as a function of a place on the mirror, or as a function of the position of the mirror relative to the input port and/or the output port, or both. The mirror may for example have varying reflectivity across its surface.

BRIEF DESCRIPTION OF THE DRAWINGS

The invention will be described in more detail by way of the following description with reference to the drawings in which.

DETAILED DESCRIPTION OF THE INVENTION

Figure 1:
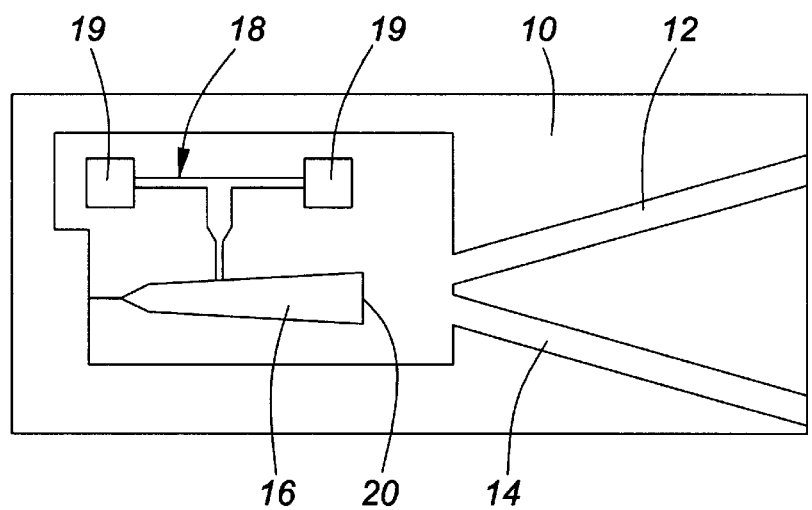
FIG. 1 is a schematic diagram of an exemplary variable optical attenuator according to the present invention.

FIG. 1 shows an exemplary planar variable optical attenuator according to the invention. The attenuator is built on a planar silicon substrate 10 and has an overall size of the order of a few millimeters or less. Two fiber ends 12, 14 are mounted in alignment grooves of the substrate and they define an input port and an output port respectively. The fibers may be typical single-mode fibers, with a cladding diameter in the range 75~150 $\mu$m. Alternatively, the fibers may be replaced with other optical waveguides. Instead of the angular arrangement of the fibers, a double-fiber tube, known in the art, may be mounted on the substrate, subject to the spatial requirements.

The fiber ends face a mirror element 16 etched from the substrate and attached to a thermal arched beam (TAB) actuator 18. Alternatively, the mirror element 16 may be made of a different material and attached to a mount etched from the substrate.

The fiber ends may preferably be associated with lenses or other light focusing means to enable focusing of an incident light beam from the input port on the mirror 16. For example, mode-field expanding fibers (TEC fibers) may be employed. Alternatively, short sections of fiber with a parabolic index profile can be spliced to the input and output fibers to act as lenses. In the embodiment illustrated, the distance between the fiber ends and the mirror may be of the order of 600 $\mu$m, and the waist of the light beam at the mirror may be of the order of 30 $\mu$m.

As known from the above-mentioned art, the TAB actuator 18 has two supports 19 mounted on the substrate and an arched beam extending between the supports. A heat source, not illustrated, may be provided either directly on the beam, or disposed on the substrate and spaced apart from the beam. Activation of the heat source causes a thermal expansion of the beam, a resultant change of its shape and a displacement of the mirror 16 attached to the actuator 18. As can be seen in FIG. 1, the displacement is lateral relative to the input and output port.

The mirror is oriented substantially perpendicularly to the substrate and substantially in the plane of the substrate. The mirror is movable over the surface of the substrate at a small distance therefrom, as known in the art of MEMS.

The mirror element 16 has a reflective surface 20 coated thereon, of continuously varying effective reflectivity across the surface. The surface may either be curved, as shown in FIG. 1, or flat.

The following exemplary techniques to achieve the varying reflectivity are proposed, without limiting the invention thereto.

a) deposition of metallic gold through a shadow mask designed to yield a coating of variable thickness and thus reflectivity b) a grating with a period within the range 1~20 $\mu$m is etched across the mirror surface. The depth of the grating can range e.g. from zero at one side of the mirror (in the direction of displacement) to a quarter-wavelength at the other side. A uniform gold coating over the grating will then yield the desired variation in reflectivity;

c) the reflective surface coated on the mirror element 16 is curved (FIG. 1) so that light is strongly reflected from a region of the curve roughly parallel to the mirror element 16, and less reflected from the a region that is more steeply sloped. This feature may be combined with one of the above features a) and b).

Figure 2:
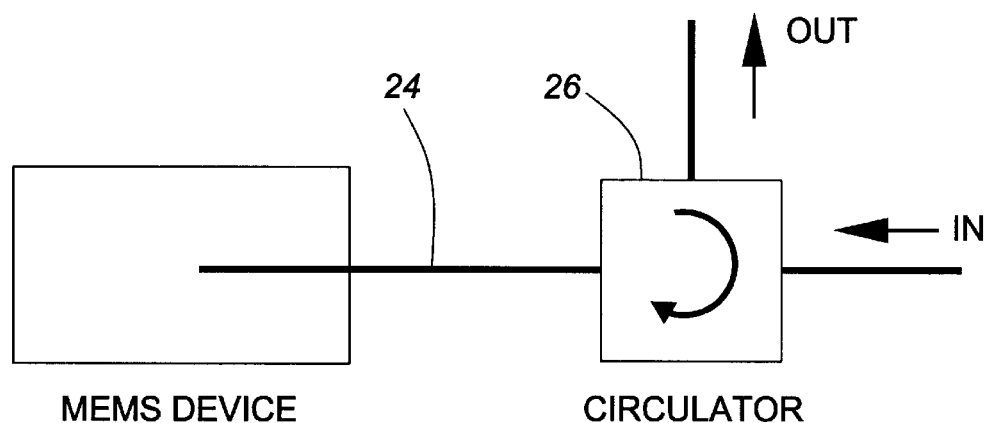
FIG. 2 is a schematic diagram of another embodiment of the attenuator of the invention, with a single input/output port.

As shown in FIG. 2, it is not necessary to provide a separate input port and an output port. Instead, a single input/output port may be provided by way of a single fiber pigtail 24 and a circulator 26.

While TAB actuators have been described and illustrated herein by way of example, other actuators, preferably suitable for MEMS structures, e.g. comb drives, may be used.

We claim:

1. A planar optical attenuator comprising:

a substantially planar substrate, an input port disposed to provide an input optical beam, a variable reflectivity mirror disposed substantially in the plane of the substrate, the mirror coupled to receive the input optical beam and to provide a reflected optical beam, the variability of the mirror being dependent on a place on the mirror, an output port disposed to receive at least part of the reflected optical beam, and an actuator for changing the position of the mirror relative to the direction of the input beam to vary the strength of the reflected optical beam.

2. The attenuator according to claim 1 wherein the actuator is disposed to effect a lateral displacement of the mirror relative to the path of the input optical beam.

3. The attenuator according to claim 1 wherein the mirror has a non-planar reflective surface.

4. The attenuator according to claim 1 wherein said surface comprises a diffraction grating.

5. The attenuator according to claim 1 wherein said actuator comprises a thermal arched beam (TAB) actuator.

6. The attenuator according to claim 2 wherein said actuator comprises a thermal arched beam (TAB) actuator.

7. The attenuator according to claim 3 wherein said actuator comprises a thermal arched beam (TAB) actuator.

8. The attenuator of claim 4 wherein said surface further comprises a reflective coating.

9. The attenuator of claim 1 wherein said surface comprises a reflective coating of varying reflectivity.

10. The attenuator of claim 1, wherein the input port and the output port are disposed substantially in the plane of the substrate.

* * * * *

UNITED STATES PATENT AND TRADEMARK OFFICE
CERTIFICATE OF CORRECTION

PATENT NO.      : 6,556,765 B2
DATED           : April 29, 2003
INVENTOR(S)     : Heffner et al.

It is certified that error appears in the above-identified patent and that said Letters Patent is hereby corrected as shown below:

<u>Title page,</u>
Item [73], delete the Assignee, "E-Tek Dynamics, Inc." and insert -- JDS Uniphase Corporation --.

Signed and Sealed this

Thirtieth Day of December, 2003

JAMES E. ROGAN
*Director of the United States Patent and Trademark Office*